(No Model.)
H. S. STEBBINS.
AUTOMATIC FISHING REEL.
No. 541,394. Patented June 18, 1895.
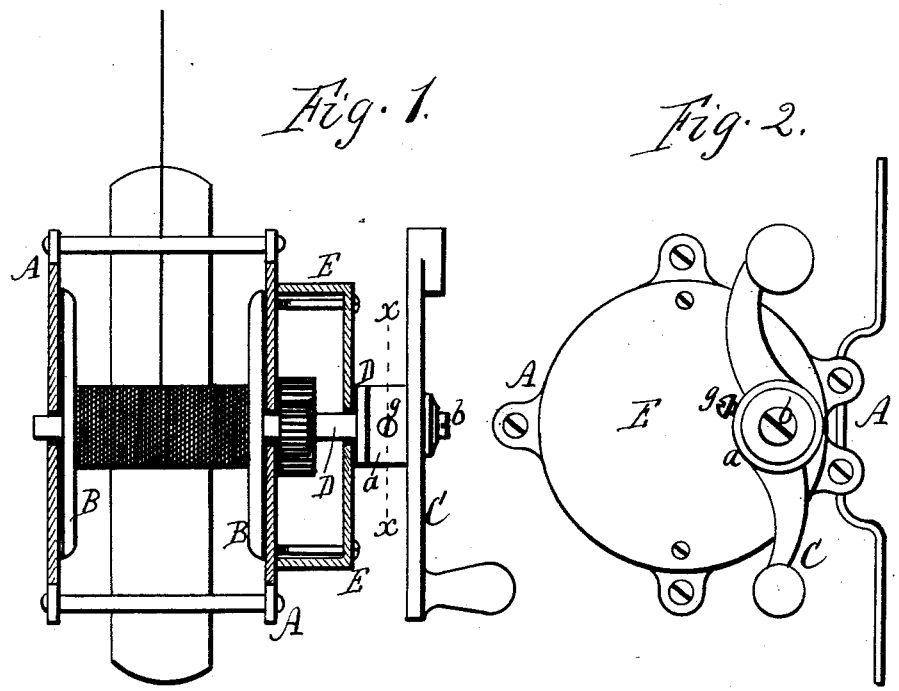
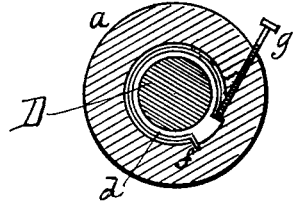
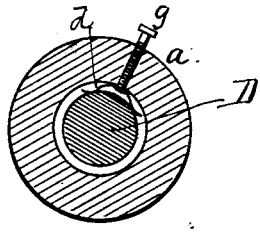
Witnesses:
E. L. Wallace
Chas. H. Widener
Inventor.
Henry S. Stebbins,
per R. F. Osgood,
Attorney.

UNITED STATES PATENT OFFICE.

HENRY S. STEBBINS, OF HAMMONDSPORT, NEW YORK.

AUTOMATIC FISHING-REEL.

SPECIFICATION forming part of Letters Patent No. 541,394, dated June 18, 1895.

Application filed December 19, 1894. Serial No. 532,294. (No model.)

*To all whom it may concern:*

Be it known that I, HENRY S. STEBBINS, of Hammondsport, in the county of Steuben and State of New York, have invented a certain new and useful Improvement in Automatic Fishing-Reels; and I do hereby declare that the following is a full, clear, and exact description of the same, reference being had to the drawings accompanying this application.

My improvement relates to what are known as automatic fishing reels. In such devices the fish is enabled to draw out the line independently of the winding action of the reel, but is drawn in again when the tension is removed without producing slack of the line. In ordinary reels of the kind a coiled spring is used to enable the line to be drawn out by the fish against the winding action of the reel.

It is the object of my invention to simplify the construction by dispensing with the spring, and it consists in the combination and arrangement of parts hereinafter more fully described and embraced in the claim.

In the drawings, Figure 1 is a longitudinal section of a fishing-reel, showing my improvement. Fig. 2 is a side elevation of the same. Fig. 3 is an enlarged cross-section in line $xx$ of Fig. 1. Fig. 4 is a view of the friction-spring. Fig. 5 is a cross-section similar to Fig. 3, but showing a modification.

The reel itself is of ordinary construction, and consists of the stationary portion or frame A, which is attached to the rod, and the winding spool B turning within the frame and operated by the crank C attached to the shaft D. The drawings show what is known as a multiplying reel—a set of gearing being located inside the case E, and giving accelerated motion to the winding spool in the usual manner; but my invention is equally applicable to single-acting reels, or those consisting simply of the frame and a winding spool.

The shaft D which imparts motion to the winding spool, instead of being attached fast to the crank C, is attached loosely so that under resistance of the shaft the crank will turn freely thereon. To this end the crank has a hub portion $a$, which fits loosely upon the projecting end of the shaft and is held thereto by a screw $b$, which prevents it from slipping off. Inside this hub, covering a greater or less arc of the perimeter of the shaft D, is a light spring $d$, preferably attached to the hub $a$ at the point $f$, and pressed into contact with the shaft by a screw $g$, that passes through the hub and is operated from the outside; or having said spring loosely attached to the screw $g$, as shown in Fig. 5. It will be seen, that when the spring is pressed into contact with the shaft the friction is sufficient to cause the shaft and winding spool to rotate with the crank; but when sufficient resistance is applied to the winding spool the spring will slip on the shaft and the crank will rotate without giving motion to the shaft.

In the use of the device, when a fish strikes it is drawn up by the line unless its resistance overcomes the friction of the spring on the shaft, in which case the crank turns independently in one direction while the winding spool may turn backward in the other direction under the strain to which it is subjected; but the line always remains taut, for the moment the fish releases the tension by reverse action, the line begins to wind again to draw the fish up. The line, therefore, is never slack. By this means any degree of play may be given to the fish without changing the tension of the line or releasing the hold.

This device is much simpler, cheaper, and can be put in more compact form than reels having coiled springs, and is more desirable, as it puts the controlling power into a crank operated by the hand. By turning the set screw $g$ more or less, the friction of the spring on the shaft can be graduated to heavy or light fish.

Having described my invention, what I claim as new, and desire to secure by Letters Patent, is—

In a fishing reel, the combination of the frame A, the winding spool B turning therein, the shaft D, the crank C provided with a hub $a$, fitting loosely on the shaft, the spring $d$, in the hub resting against the shaft, and the set screw $g$ passing through the hub and pressing the spring against the shaft, as shown and described and for the purpose specified.

In witness whereof I have hereunto signed my name in the presence of two subscribing witnesses.

HENRY S. STEBBINS.

Witnesses:
MONROE WHEELER,
W. W. EASTMAN.